(12) United States Patent
Tsuei

(10) Patent No.: US 8,010,163 B2
(45) Date of Patent: Aug. 30, 2011

(54) METHOD FOR DISPLAYING DIALING INFORMATION AND MOBILE COMMUNICATION DEVICE USING THE METHOD

(75) Inventor: Yuan-Mao Tsuei, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 469 days.

(21) Appl. No.: 12/267,229

(22) Filed: Nov. 7, 2008

(65) Prior Publication Data

US 2009/0124293 A1 May 14, 2009

(30) Foreign Application Priority Data

Nov. 8, 2007 (TW) ................................. 96142212 A

(51) Int. Cl.
*H04B 1/38* (2006.01)
(52) U.S. Cl. .................... 455/566; 345/173; 345/158
(58) Field of Classification Search ........................ None
See application file for complete search history.

(56) References Cited

U.S. PATENT DOCUMENTS

2003/0128188 A1\* 7/2003 Wilbrink et al. ............... 345/158
2010/0164897 A1\* 7/2010 Morin et al. ................... 345/173

FOREIGN PATENT DOCUMENTS

CN 101039477 A 9/2007

\* cited by examiner

*Primary Examiner* — Phuoc Doan
(74) *Attorney, Agent, or Firm* — Birch, Stewart, Kolasch & Birch, LLP

(57) ABSTRACT

A method for displaying dialing information is disclosed. A touch panel of a mobile communication device comprises a first display area and a second display area. When a trigger signal generated by pressing a virtual button of a virtual keypad of the mobile communication device is received, it is determined whether the trigger signal corresponds to a dialing operation. If the trigger signal corresponds to the dialing operation, a first contact information corresponding to a pattern of the pressed virtual button is displayed in the second display area, and the pattern is overlapping displayed on a specified portion of the second display area.

17 Claims, 4 Drawing Sheets

METHOD FOR DISPLAYING DIALING INFORMATION AND MOBILE COMMUNICATION DEVICE USING THE METHOD

CROSS REFERENCE TO RELATED APPLICATIONS

This Application claims priority of Taiwan Patent Application No. 96142212, filed on Nov. 8, 2007, the entirety of which is incorporated by reference herein.

BACKGROUND OF THE INVENTION

Generally, when a touch panel of a mobile communication device (a personal digital assistant (PDA), for example) is used to dial a phone number, the touch panel usually comprises two display areas, one is for displaying a soft keypad (virtual keypad, monitor keypad), the other one is for displaying a dialed phone number. As shown in FIG. 1, a touch panel of a mobile communication device 100 comprises two display areas 110 and 120. The display area 110 displays a soft keypad, which is usually located at the lower portion of the touch panel. The display area 120 displays a dialed phone number, which is usually located at the upper portion of the touch panel. In some mobile communication device, another display area 130 is farther provided for displaying the contact information corresponding to the dialed phone number.

As described, a touch panel for dialing a phone number usually has two or more display areas, therefore the display area size for the virtual keypad is limited. The display area size for each virtual button of the virtual keypad is so small that neighboring virtual buttons may be accidentally touched when a specific number or symbol of a virtual button is pressed.

Thus, a method for displaying dialing information without reducing the size for displaying virtual buttons of a virtual keypad for a mobile communication device to reduce accidental touch is desirable.

BRIEF SUMMARY OF THE INVENTION

Methods for displaying dialing information are provided. The method for displaying dialing information comprises the following steps. A first display area and a second display area for a touch panel of a mobile communication device are provided. A virtual keypad, comprising at least one virtual button, is displayed at the first display area. A trigger signal generated by pressing the virtual button is received. It is determined whether the trigger signal corresponds to a dialing operation. If the trigger signal corresponds to the dialing operation, a first contact information corresponding to a pattern of the pressed virtual button is displayed in the second display area and the pattern of the pressed virtual button is overlapping displayed in a specified portion of the second display area.

Mobile communication devices are provided. The mobile communication device comprises a touch panel, a signal receiving module and a microcontroller. The touch panel provides a first display area, in which a virtual keypad comprising plural virtual buttons is built, and a second display area. The signal receiving module receives a trigger signal generated by pressing one of the virtual buttons. The microcontroller receives the trigger signal from the signal receiving module, determines whether the trigger signal corresponds to a dialing operation, and, if the trigger signal corresponds to the dialing operation, displays a first contact information corresponding to a pattern of the pressed virtual button in the second display area and overlapping displays the pattern of the pressed virtual button in a specified portion of the second display area.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

Figure 1:
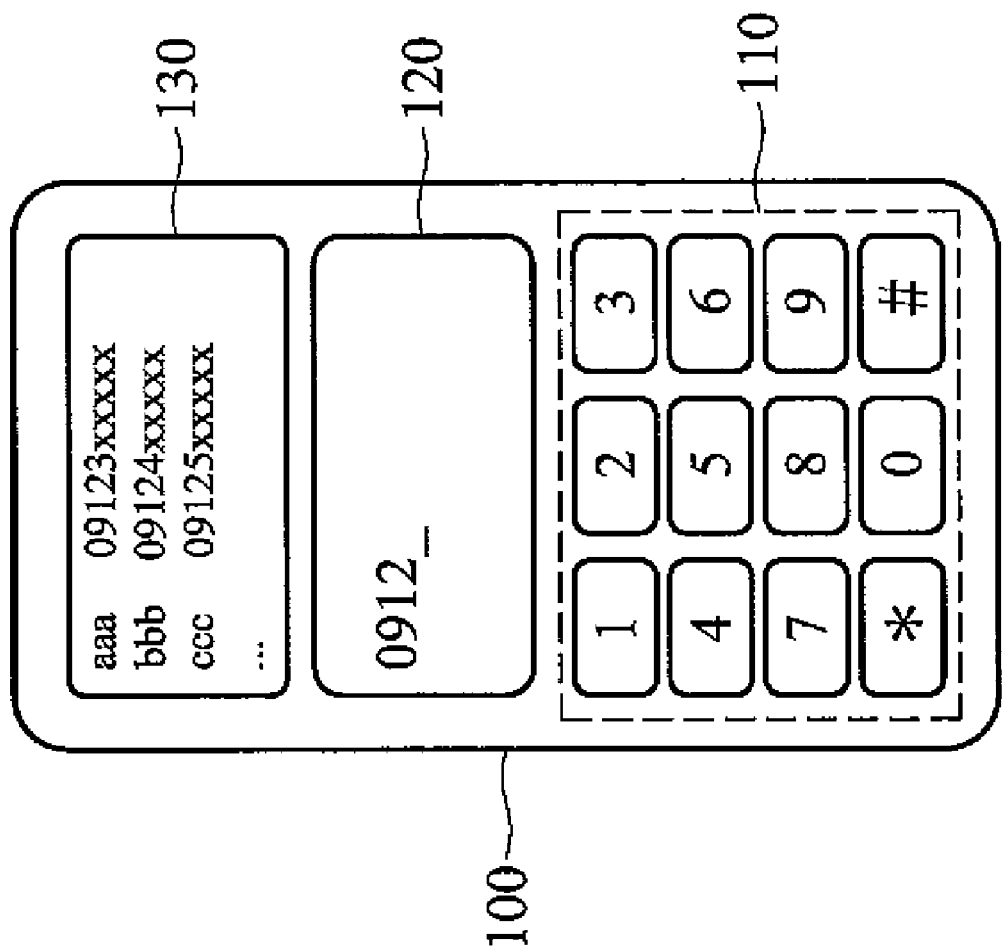
FIG. 1 is a schematic view of dialing telephone number using a mobile communication device.

Several exemplary embodiments of the disclosure are described with reference to FIGS. 2 through 4, which generally relate to dialing information display. It is to be understood that the following disclosure provides various different embodiments as examples for implementing different features of the disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The disclosure discloses a method for displaying dialing information for a mobile communication device.

In an embodiment of a method for displaying dialing information of the disclosure, a display area for displaying a pattern of the pressed virtual button(s), for example a dialed telephone number, is removed. The pattern of the pressed virtual button(s) is overlapping displayed in a display area for displaying contact information corresponding to the pattern of the pressed virtual button(s). Therefore, the size of the display area for displaying virtual keypad is enlarged.

Figure 2B:
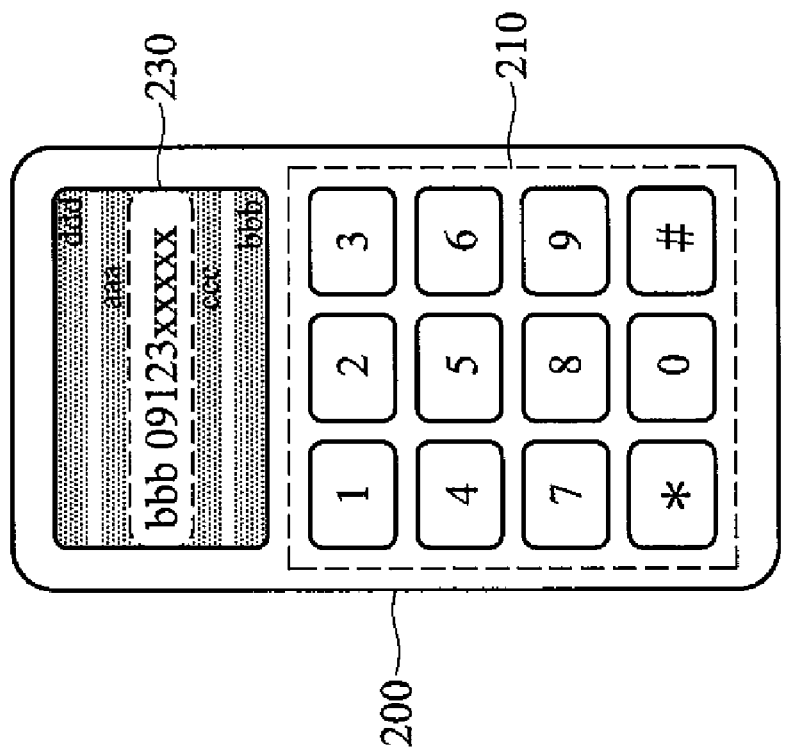
FIGS. 2A and 2B are schematic views of overlapping displaying a pattern of to the pressed virtual buttons in a display area displaying contact information corresponding to the pattern of to the pressed virtual buttons of the present invention.
Figure 2A:
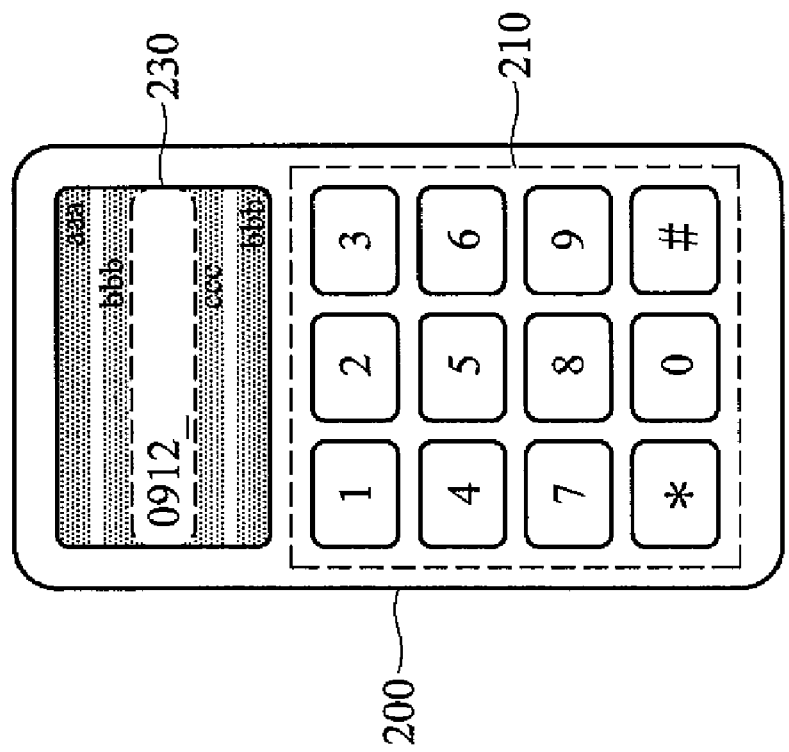

FIGS. 2A and 2B are schematic views of overlapping displaying a pattern of to the pressed virtual button(s) in a display area displaying contact information corresponding to the pattern of to the pressed virtual button(s) of the present invention.

As shown in FIG. 2A, a touch panel of a mobile communication device 200 provides display areas 210 and 230. The display area 210 shows a virtual keypad comprising at least one virtual button, the display area 230 shows plural items of contact information corresponding to a pattern of the pressed virtual button(s), for example, but not limited to, a dialed telephone number or a contact name. The pattern of the pressed virtual button(s) is overlapping displayed in the display area 230. Since a display area showing the pattern of the pressed virtual button(s) is not additionally provided, the display area 210 can be enlarged so that the size of the virtual button(s) of the virtual keypad can be increased to reduce accidentally touched buttons. As shown in FIG. 2B, when a contact is selected from the items of the first contact information corresponding to the pattern of the pressed virtual button(s), a second contact information corresponding to the selected contact is displayed in the display area originally showing the pattern of the pressed virtual button(s).

Figure 3:
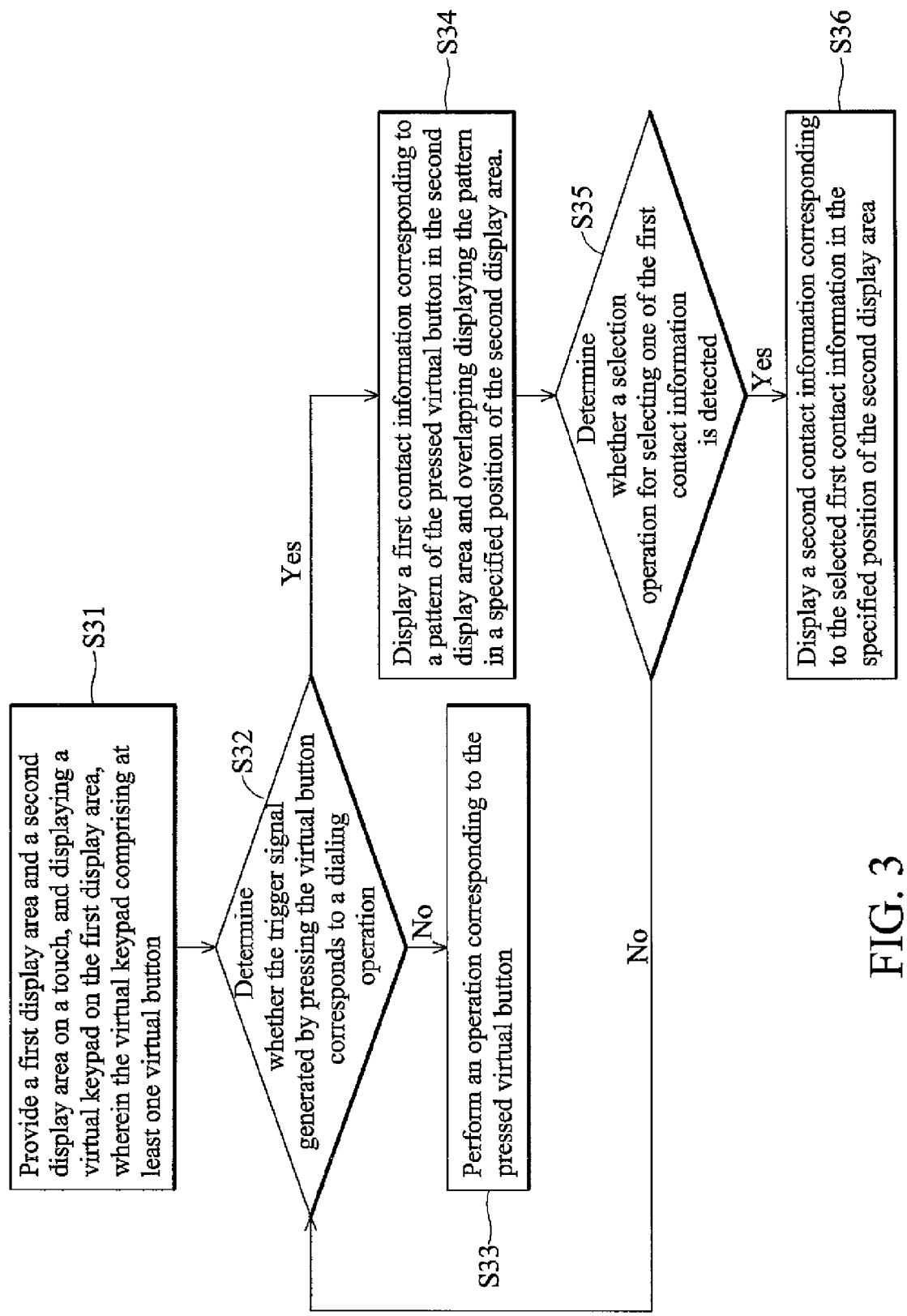
FIG. 3 is a flowchart of a method for displaying dialing information of the present invention.

FIG. 3 is a flowchart of a method for displaying dialing information of the present invention.

A first display area and a second display area are provided on a touch panel of a mobile communication device (step S31). The first display area shows a virtual keypad comprising at least one virtual button. The second display area shows contact information corresponding to a pattern of the pressed button(s). Furthermore, a virtual object overlap function is provided in step S31. The virtual object overlap function overlaps at least two virtual objects so that one virtual object is overlapping displayed above another virtual object.

When a trigger signal generated by pressing a virtual button of the virtual keypad is received, it is determined whether the trigger signal corresponds to a dialing operation (step S32). If the trigger signal does not correspond to the dialing operation, an operation corresponding to the virtual button is performed (step S33). If the trigger signal corresponds to the dialing operation, a first contact information corresponding to a pattern of the pressed virtual button(s) is displayed in the second display area and the pattern of the pressed virtual button(s) is overlapping displayed in a specified portion of the second display area (step S34), as shown in FIG. 2A.

In an embodiment, the pattern corresponding to the pressed virtual button(s) is translucently displayed in the second display area, so that the pattern can be clearly recognized.

In this embodiment, patterns on the virtual buttons represent numbers or symbols ("#" and "*", for example).

In another embodiment, it is determined whether a selection operation is detected (step S35). The selection operation is for selecting one of the first contact information corresponding to the pattern of the virtual button(s). If a selection operation is detected, a second contact information corresponding to the selected first contact information is displayed in a specified position of the second display area (step S36), as shown in FIG. 2B. In this embodiment, the second contact information comprises a contact name or telephone number.

In an embodiment, the method for displaying dialing information of the application can be achieved by using the techniques comprising the techniques for making an object translucent such as alpha blending, texture mapping, and the like, or the techniques for overlapping displaying such as JAVA script, cascading style sheets (CSS), and the like.

Figure 4:
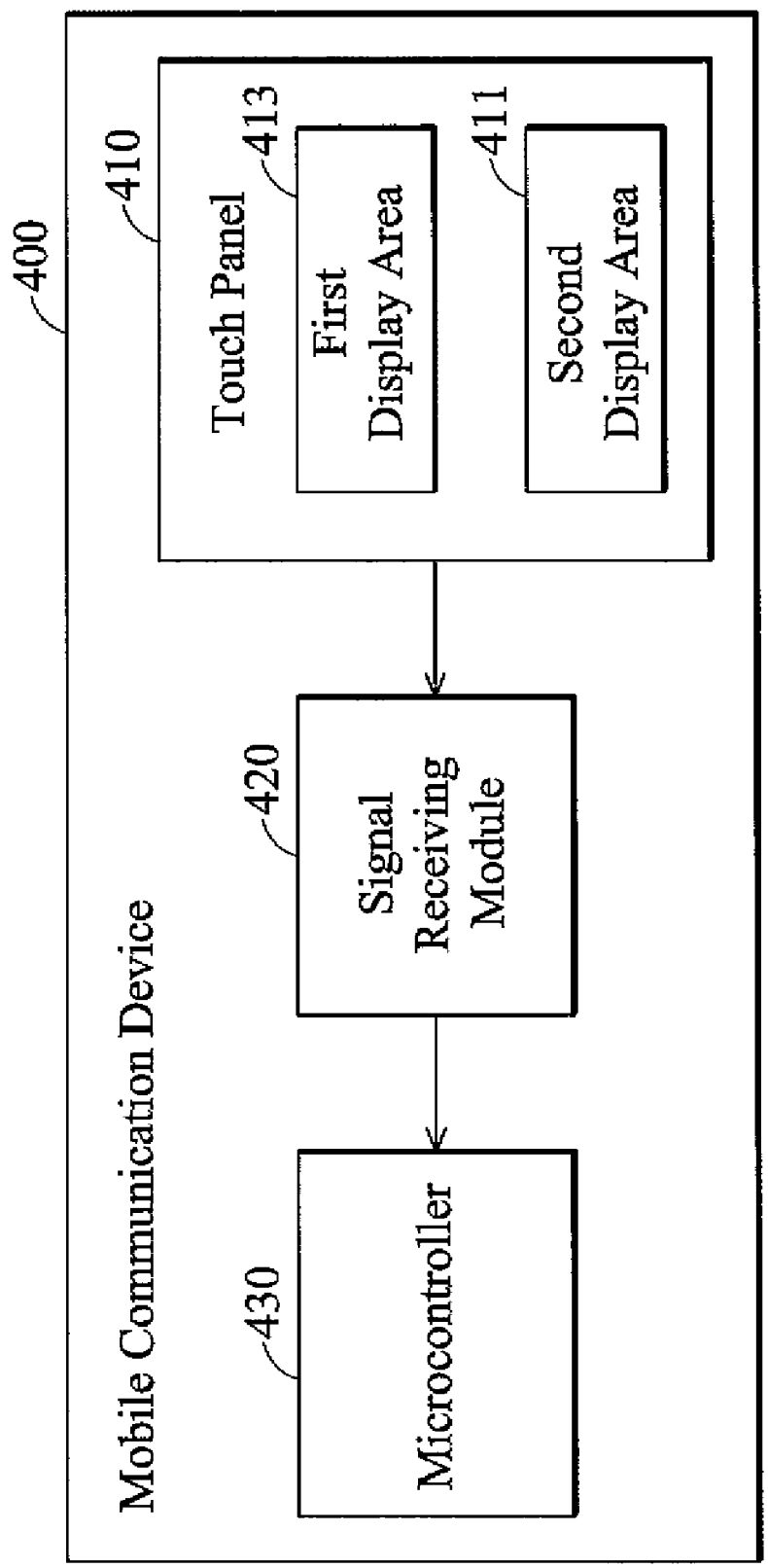
FIG. 4 is a schematic view of a mobile communication device of the present invention.

FIG. 4 is a schematic view of a mobile communication device of the present invention.

A mobile communication device 400 comprises a touch panel 410, a signal receiving module 420, and a microcontroller 430. The touch panel 410 comprises a first display area 411, in which a virtual keypad providing plural virtual buttons is built, and a second display area 413 showing contact information corresponding to a pattern of the pressed virtual button(s), for example a dialed telephone number or a contact name.

The microcontroller 430 receives a trigger signal, generated by pressing a virtual button of the virtual keypad displayed in the first display area 411, from the signal receiving module 420 and determines whether the trigger signal corresponds to a dialing operation. If the trigger signal does not correspond to the dialing operation, the microcontroller 430 performs an operation corresponding to the pressed virtual button. If the trigger signal corresponds to the dialing operation, the microcontroller 430 displays a first contact information corresponding to the pattern of the pressed virtual button(s) in the second display area and overlapping displays the pattern of the pressed virtual button(s) in a specified position of the second display area using the virtual object overlap function, as shown in FIG. 2A.

In this embodiment, the first contact information comprises a contact name, telephone number, a pattern corresponding to the pressed virtual button(s) comprising numbers or symbols ("#" and "*", for example).

In an embodiment, the microcontroller 430 further determines whether a selection operation is detected. The selection operation is for selecting one of the first contact information corresponding to the pattern of the pressed virtual button(s). If a selection operation is detected, the microcontroller 430 displays a second contact information corresponding to the selected first contact information in the specified position of the second display area, as shown in FIG. 2B. In this embodiment, the second contact information comprises a contact name or telephone number.

In an embodiment, the first display area 411 is at least two times larger than the second display area 413 to reduce accidental touch.

In an embodiment, the mobile communication device 400 comprises a personal digital assistant (PDA) phone.

Methods and systems of the present disclosure, or certain aspects or portions of embodiments thereof, may take the form of a program code (i.e., instructions) embodied in media, such as floppy diskettes, CD-ROMs, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying dialing information, comprising:

providing a first display area and a second display area on a touch panel of a mobile communication device;

displaying a virtual keypad on the first display area, wherein the virtual keypad comprising at least one virtual button;

receiving a trigger signal generated by pressing the virtual button;

determining whether the trigger signal corresponds to a dialing operation; and if the trigger signal corresponds to the dialing operation, displaying a first contact information corresponding to a pattern of the pressed virtual button in the second display area and overlapping displaying the pattern in a specified position of the second display area.

2. The method for displaying dialing information as claimed in claim 1, further comprising performing an operation corresponding to the virtual button if the trigger signal does not correspond to the dialing operation.

3. The method for displaying dialing information as claimed in claim 1, wherein the first contact information comprising a contact name or telephone number.

4. The method for displaying dialing information as claimed in claim 1, further comprising:
   determining whether a selection operation is detected, wherein the selection operation is for selecting one of the first contact information; and
   if the selection operation is detected, displaying a second contact information corresponding to the selected first contact information in the specified position of the second display area.

5. The method for displaying dialing information as claimed in claim 4, wherein the second contact information comprising a contact name or telephone number.

6. The method for displaying dialing information as claimed in claim 1, wherein the pattern represents a number.

7. The method for displaying dialing information as claimed in claim 1, wherein the pattern represents a symbol.

8. A computer-readable storage medium containing instructions for performing the method of claim 1.

9. A mobile communication device, comprising:
   a touch panel, providing a first display area and a second display area, wherein a virtual keypad comprising plural virtual buttons is displayed on the first display area;
   a signal receiving module, receiving a trigger signal generated by pressing of one of the virtual buttons; and
   a microcontroller, receiving the trigger signal from the signal receiving module, determining whether the trigger signal corresponds to a dialing operation, and, if the trigger signal corresponds to the dialing operation, displaying a first contact information corresponding to a pattern of the pressed virtual button in the second display area and overlapping displaying the pattern in a specified position of the second display area.

10. The mobile communication device as claimed in claim 9, wherein the microcontroller performs an operation corresponding to the virtual button if the trigger signal does not correspond to the dialing operation.

11. The mobile communication device as claimed in claim 9, wherein the first contact information comprising a contact name or telephone number.

12. The mobile communication device as claimed in claim 9, wherein, when a selection operation for selecting one of the first contact information is detected, the microcontroller displays a second contact information corresponding to the selected first contact information in the specified position of the second display area.

13. The mobile communication device as claimed in claim 12, wherein the second contact information comprising a contact name or telephone number.

14. The mobile communication device as claimed in claim 9, wherein the pattern represents a number.

15. The mobile communication device as claimed in claim 9, wherein the pattern represents a symbol.

16. The mobile communication device as claimed in claim 9, wherein the first display area is at least two times larger than the second display area.

17. The mobile communication device as claimed in claim 9, wherein the mobile communication device comprises a personal digital assistant (PDA) phone.

* * * * *

UNITED STATES PATENT AND TRADEMARK OFFICE
CERTIFICATE OF CORRECTION

PATENT NO. : 8,010,163 B2  
APPLICATION NO. : 12/267229  
DATED : August 30, 2011  
INVENTOR(S) : Yuan-Mao Tsui It is certified that error appears in the above-identified patent and that said Letters Patent is hereby corrected as shown below:

ON THE TITLE PAGE:

Correct item (75), Inventor, as follows:

-- (75) Inventor: Yuan-Mao Tsui, Taoyuan County (TW) --.

Signed and Sealed this
Eighth Day of May, 2012

David J. Kappos
*Director of the United States Patent and Trademark Office*